(12) United States Patent
Swanson

(10) Patent No.: US 10,891,682 B2
(45) Date of Patent: *Jan. 12, 2021

(54) CONNECTING PEOPLE WITHIN PHYSICAL SPACES

(71) Applicant: BONDER, INC., San Jose, CA (US)

(72) Inventor: Scott Swanson, San Jose, CA (US)

(73) Assignee: BONDER, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,359

(22) Filed: Jun. 19, 2019

(65) Prior Publication Data

US 2019/0304003 A1 Oct. 3, 2019

Related U.S. Application Data

(63) Continuation of application No. 15/589,211, filed on May 8, 2017, now Pat. No. 10,360,615.

(51) Int. Cl.
| | |
|---|---|
| *G06Q 30/00* | (2012.01) |
| *G06Q 30/06* | (2012.01) |
| *G06Q 10/06* | (2012.01) |
| *G06Q 50/00* | (2012.01) |
| *G06Q 30/02* | (2012.01) |

(52) U.S. Cl.
CPC ....... *G06Q 30/0633* (2013.01); *G06Q 10/067* (2013.01); *G06Q 30/0224* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,756,458 B1* | 9/2017 | Chein | H04L 67/306 |
| 2006/0085419 A1* | 4/2006 | Rosen | G06Q 30/0269 |
| 2013/0185368 A1 | 7/2013 | Nordstrom et al. | |
| 2014/0059133 A1* | 2/2014 | Wang | B67D 1/0872 709/204 |
| 2014/0316898 A1* | 10/2014 | Russell | G06Q 30/0281 705/14.58 |
| 2016/0210098 A1* | 7/2016 | Landau | G06F 15/0291 |
| 2016/0275540 A1 | 9/2016 | Finnegan et al. | |
| 2017/0124093 A1 | 5/2017 | Carbonell et al. | |

OTHER PUBLICATIONS

International Search Report and Written Opinion dated Sep. 27, 2018 for International Patent Application No. PCT/US 2018/031227, 8 pages.

* cited by examiner

*Primary Examiner* — Mila Airapetian
(74) *Attorney, Agent, or Firm* — Perkins Coie LLP

(57) ABSTRACT

Facilitating conversations among people within physical spaces is described. An interaction tablet can be housed within a physical space and configured to receive profile information from mobile devices of customers. The profile information can indicate conversational topics that customers are interested in within the physical space. Similarities between conversational topics of customers can be determined and those customers can be recommended to engage in a conversation regarding that conversational topic. One customer can also be provided information regarding what another customer prefers to purchase from the physical space and, therefore, use the purchase to facilitate a conversation to create a more engaging environment within the physical space.

30 Claims, 5 Drawing Sheets

CONNECTING PEOPLE WITHIN PHYSICAL SPACES

CROSS-REFERENCE TO RELATED APPLICATIONS

This application is a continuation of U.S. patent application Ser. No. 15/589,211, filed May 8, 2017, now U.S. Pat. No. 10,360,615, issued Jul. 23, 2019, which is incorporated by reference herein in its entirety.

TECHNICAL FIELD

This disclosure relates to connecting people within physical spaces, and in particular facilitating conversations among people within physical spaces such as retail stores.

BACKGROUND

Some physical spaces, such as coffee shops, provide a meeting place where people can order coffee and spend time at a table. Often, coffee shops have wireless networks offering access to the Internet to encourage customers to extend their stays. This can result in some customers being repeat customers, and some of those repeat customers might overlap their stays and recognize each other. However, some of the customers might find it difficult or uncomfortable to interact with each other without knowing more about each other. Thus, the physical space might not provide much social interaction.

SUMMARY

Some of the subject matter described herein includes a method for connecting people within a retail space to engage in a conversation with each other, the method comprising: determining, by a tablet device housed within the retail space, that a first mobile device corresponding to a first customer has entered the retail space, the determination made by receiving a first profile information of the first customer that is generated by an interaction application of the first mobile device that is configured to provide the first profile information to the tablet device; storing, by the tablet device, the first profile information in a database, the first profile information indicating a conversational topic that the first customer is interested in engaging in within the retail space, a profile type that is one of a personal profile type or a business profile type providing further context regarding the conversational topic, and a product preference indicating a product that the first customer prefers to purchase from the retail space; determining, by the tablet device, that a second mobile device corresponding to a second customer has entered the retail space, the determination also made by receiving a second profile information of the second customer that is generated by the interaction application of the second mobile device; storing, by the tablet device, the second profile information in the database, the second profile information indicating a conversational topic that the second customer is interested in engaging in within the retail space, and a profile type that is one of the personal profile type or the business profile type; determining, by the tablet device, that the conversational topic of the first profile information and the second profile information are the same, and that profile type of the first profile information corresponding to the first customer and the second profile information corresponding to the second customer are the same; providing, by the tablet device, an indication to the second mobile device corresponding to the second customer that the first customer is available within the retail space to discuss the conversational topic; providing, by the tablet device, an indication regarding the product preference of the first customer; and receiving, by the tablet device, a request from the second mobile device of the second customer to prepare the product corresponding to the product preference of the first customer to facilitate an introduction to a conversation regarding the conversational topic between the first customer and the second customer within the retail space; and generate, by the tablet device, a purchase request for an employee of the retail space to prepare a product corresponding to the product preference for the second customer to provide the first customer to facilitate the conversation regarding the conversational topic.

Some of the subject matter described herein also includes a method, comprising: receiving, by a processor, a first profile information of a first customer, the first profile information representing a conversational topic that the first customer is interested in having within a physical space; determining, by the processor, that a second profile information of a second customer that is within the physical space also represents the conversational topic; providing, by the processor, information regarding the second customer within the physical space to the first customer based on the determination that the second profile information also represents the conversational topic, the information including a reference to a product or service that the second customer prefers to obtain from the retail space; receiving, by the processor, a request from the first customer to purchase the product or service; and generate, by the processor, an indication representing that the first customer wishes to purchase the product or service for the second customer to facilitate a conversation regarding the conversational topic.

In some implementations, the first profile information of the first customer also represents a first profile type, and the second profile information of the second customer also represents a second profile type, the first profile type of the first profile information and the second profile type of the second profile information being one of a personal profile or a business profile.

In some implementations, the personal profile and the business profile represent a context regarding the conversational topic.

In some implementations, the method includes determining that the first profile type and the second profile type are similar, wherein providing the information regarding the second customer within the physical space is further based on the determination that the first profile type and the second profile type are similar.

In some implementations, the method includes determining similarities between purchase histories of the first customer and the second customer, the purchase histories representing purchases of products or services related to the physical space, wherein providing the information regarding the second customer within the physical space is further based on the similarities between the purchase histories.

In some implementations, the method includes determining similarities between conversational histories of the first customer and the second customer within the physical space, wherein providing the information regarding the second customer within the physical space is further based on the similarities between the conversational histories.

In some implementations, the first customer and the second customer are both within the physical space.

In some implementations, the first mobile device corresponding to the first customer and the second mobile device corresponding to the second customer are communicatively coupled with a wireless network implemented within the physical space.

In some implementations, the method includes: determining that the first customer and the second customer are engaged in the conversation; and providing a message regarding a promotional discount of a product or a service provided by the physical space based on the determination that the first customer and the second customer are engaged in the conversation.

Some of the subject matter described herein also includes a system, comprising: a database storing a first profile information of a first customer having a first mobile device that is within a physical space, the first profile information indicating a conversational topic that the first customer is interested in within the physical space, the first profile information also indicating a reference to a product or a service that the first customer prefers to purchase from the physical space; a customer interaction logic configured to determine that a second customer having a second mobile device has entered the physical space and is associated with a second profile information indicating a conversational topic that the second customer is interested in within the physical space, and configured to determine that the conversational topic of the first profile information and the second profile information are similar; and a customer engagement logic configured to provide information regarding the first customer within the physical space to the second mobile device of the second customer, the information including a reference to the product or the service that the first customer prefers, and configured to generate an indication that the first customer wishes to purchase the product of the service for the second customer to facilitate a conversation regarding the conversational topic.

In some implementations, the first profile information of the first customer also represents a first profile type, and the second profile information of the second customer also represents a second profile type, the first profile type of the first profile information and the second profile type of the second profile information being one of a personal profile or a business profile.

In some implementations, the personal profile and the business profile represent a context regarding the conversational topic.

In some implementations, the customer interaction logic is further configured to determine that the first profile type and the second profile type are similar, wherein providing the information regarding the second customer within the physical space is further based on the determination that the first profile type and the second profile type are similar.

In some implementations, the customer interaction logic is further configured to determine similarities between purchase histories of the first customer and the second customer, the purchase histories representing purchases of products or services related to the physical space, wherein providing the information regarding the second customer within the physical space is further based on the similarities between the purchase histories.

In some implementations, the customer interaction logic is further configured to determine similarities between conversational histories of the first customer and the second customer within the physical space, wherein providing the information regarding the second customer within the physical space is further based on the similarities between the conversational histories.

In some implementations, the first customer and the second customer are both within the physical space.

In some implementations, the first mobile device corresponding to the first customer and the second mobile device corresponding to the second customer are communicatively coupled with a wireless network implemented within the physical space.

In some implementations, the customer interaction logic is further configured to determine that the first customer and the second customer are engaged in the conversation and configured to provide a message regarding a promotional discount of a product or a service provided by the physical space based on the determination that the first customer and the second customer are engaged in the conversation.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: receive a first profile information of a first customer, the first profile information representing a conversational topic that the first customer is interested in having within a physical space; determine that a second profile information of a second customer that is within the physical space also represents the conversational topic; provide information regarding the second customer within the physical space to the first customer based on the determination that the second profile information also represents the conversational topic, the information including a reference to a product or service that the second customer prefers to obtain from the retail space; receive a request from the first customer to purchase the product or service; and generate an indication representing that the first customer wishes to purchase the product or service for the second customer to facilitate a conversation regarding the conversational topic.

In some implementations, wherein the first profile information of the first customer also represents a first profile type, and the second profile information of the second customer also represents a second profile type, the first profile type of the first profile information and the second profile type of the second profile information being one of a personal profile or a business profile.

In some implementations, the personal profile and the business profile represent a context regarding the conversational topic.

In some implementations, the computer program instructions cause the one or more computing devices to: determine that the first profile type and the second profile type are similar, wherein providing the information regarding the second customer within the physical space is further based on the determination that the first profile type and the second profile type are similar.

In some implementations, the computer program instructions cause the one or more computing devices to: determine similarities between purchase histories of the first customer and the second customer, the purchase histories representing purchases of products or services related to the physical space, wherein providing the information regarding the second customer within the physical space is further based on the similarities between the purchase histories.

In some implementations, the computer program instructions cause the one or more computing devices to: determine similarities between conversational histories of the first customer and the second customer within the physical space, wherein providing the information regarding the second customer within the physical space is further based on the similarities between the conversational histories.

In some implementations, the first customer and the second customer are both within the physical space.

In some implementations, the first mobile device corresponding to the first customer and the second mobile device corresponding to the second customer are communicatively coupled with a wireless network implemented within the physical space.

In some implementations, the computer program instructions cause the one or more computing devices to: determine that the first customer and the second customer are engaged in the conversation; and provide a message regarding a promotional discount of a product or a service provided by the physical space based on the determination that the first customer and the second customer are engaged in the conversation.

Some of the subject matter described herein also includes selecting a first profile type representing that a first customer having a first mobile device is interesting in having a conversation in one of a personal context or a business context within a physical space; providing a conversational topic related to the conversation; generating, by a processor, a first profile representing that the first customer is interested in having the conversation corresponding to the conversational topic within the physical space in the personal or the business context; providing the first profile representing the first customer to an interaction tablet housed within the physical space, the interaction tablet configured to communicate with mobile devices of customers within the physical space; receiving a second profile representing that a second customer having a second mobile device is also interesting in having the conversation corresponding to the conversational topic within the physical space in the personal or the business context associated with the first profile, the second profile also indicating a preference for a product or a service that the second customer prefers to obtain within the physical space; and generate, by the processor, a request representing that the first customer wishes to purchase the product or the service corresponding to the preference of the second customer to facilitate the conversation regarding the conversational topic.

In some implementations, the first customer and the second customer are both within the physical space.

In some implementations, wherein the first mobile device, the second mobile device, and the interaction tablet are communicatively coupled to a wireless network implemented within the physical space.

DETAILED DESCRIPTION

Figure 1:
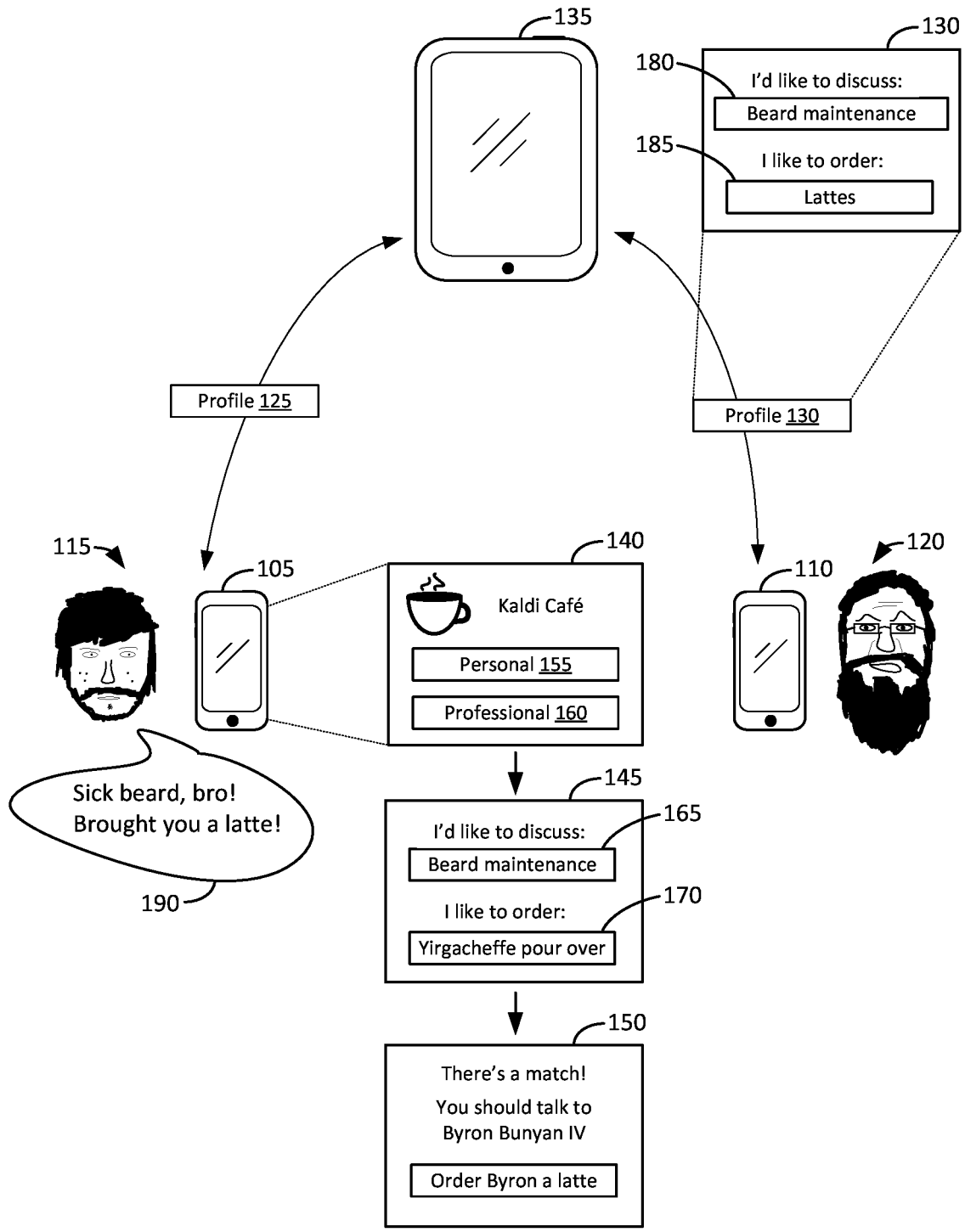
FIG. 1 illustrates an example of facilitating conversations among people within a physical space.

This disclosure describes devices and techniques for facilitating conversations among people within physical spaces. In one example, a coffee shop can provide a wireless network (e.g., implemented with one of the Institute for Electrical and Electronics Engineers (IEEE) 802.11 standards) offering access to the Internet to its customers. Thus, customers can come in, order coffee, and enjoy that coffee at one of the tables at the coffee shop while using a mobile phone (or other mobile device such as a tablet, smart watch, etc.) that has access to the Internet via the wireless network.

The customer's mobile phone can have an application installed that allows it to communicate with an interaction tablet housed within the coffee shop and also connected via the wireless network. The application on the mobile phone can generate or provide different types of a profile of the customer, for example, business or personal profiles that can indicate different topics that the customer would like to discuss and the customer's identity. Business profiles can be selected when customers are more interested in networking or professional discussions. Personal profiles can be selected when customers are interested in more social or personal types of discussions. Additionally, the profiles can indicate the type of coffee or coffee product (i.e., a product sold by the retail store such as the coffee shop) that the customer prefers. Thus, the profiles can indicate who a customer is and what they want to talk about in the moment. This profile can be received by the interaction tablet and compared with the profiles provided by other customers also having the application on their mobile phones. If the topics that the customers are interested in discussing are similar, the interaction tablet can inform the customers so that they can engage in a conversation with each other. To further facilitate the start of the conversation, the interaction tablet can also recommend one of the customers to purchase the other customer's preference for coffee.

For example, a first customer can select a business profile indicating that she would like to discuss "architecture" because she is an architect. Another, second customer can already be in the coffee shop and had previously selected a business profile indicating that he would like to discuss "architecture" also, perhaps because he is a home builder. The second customer's business profile can also indicate that he likes to order cappuccinos at the coffee shop. Thus, the first customer can be informed that there is a match for someone to discuss architecture and that customer likes to drink cappuccinos. Using the application on the smartphone, the customer can select to have an order for a cappuccino to be prepared by the coffee shop, retrieve the cappuccino, and offer it to the second customer as a way to begin a conversation regarding architecture. As a result, the customers within the coffee shop can engage with each other in a meaningful and impactful way, allowing for a visit to the coffee shop to become a more vibrant experience. Additionally, sales at the coffee shop can increase because customers can introduce one another by purchasing the other customer's preferred coffee. Moreover, customers might visit the coffee shop more often which can also lead to more sales and a more vibrant experience.

Although a coffee shop is used in the aforementioned example, other physical spaces can also be used. For example, bars, grocery stores, restaurants, conventions (e.g., trade shows, etc.), carnival grounds, circuses, concert venues, etc. can also be the physical spaces in which people can be encouraged to engage with each other using similar devices and techniques.

In more detail, FIG. 1 illustrates an example of facilitating conversations among people within a physical space. In FIG. 1, customer 115 carrying mobile device 105 might enter a coffee shop with interaction tablet 135. Mobile device 105 can include a interaction application that allows customer 115 to be connected with another customer within the coffee shop due to a shared interest in a conversational topic.

For example, the coffee shop might have a wireless network for its customers to use while enjoying their coffee products. Thus, interaction tablet 135 and mobile device 105 can be communicatively coupled with each other via the wireless network and exchange data. In FIG. 1, if it is the first time customer 115 has entered the coffee shop with mobile device 105, and mobile device 105 has the interaction application installed, then, using the wireless network, interaction tablet 135 can be provided a message from mobile device 105 that it is in the coffee shop. Interaction tablet 135 can include or have access to a database (e.g., stored locally or on a cloud server that it has access to 0 to store information that it receives from the mobile devices. Interaction tablet 135 might include data indicating the name of the coffee shop, the menu (e.g., products or services for sale and their prices), and other information related to the business. This information can be provided to mobile device 105 and saved. Customer 115 can then be informed that a social interaction activity might be present. Thus, in FIG. 1, customer 115 can use mobile device 105, open or execute the interaction application and see graphical user interface (GUI) 140 indicating that the coffee shop (e.g., "Kaldi Café" in FIG. 1) is a place that customer 115 can be matched with another customer within the same coffee shop for a discussion. As depicted in GUI 140, customer 115 can select either a personal profile 155 or a professional profile 160.

The different profiles can indicate different motivations for customer 115 to engage in interactions. For example, by selecting personal profile 155, this might indicate that customer 115 prefers to have a more personal, less business-like interaction with another customer, for example, to discuss topics such as books, films, politics, etc. By contrast, if professional profile 160 is selected, then this might indicate that customer 115 prefers to have a more professional, business-oriented interaction with another customer, for example, to discuss job opportunities, expand his business network, etc. As a result, customer 115 can have different profiles, or "micro-profiles," representing some sort of broad intent or objective that can provide further context to a conversational topic.

In FIG. 1, customer 115 can select personal profile 155 and be presented with GUI 145, which provides an opportunity for customer 115 to indicate a topic of a conversation that he wishes to have with another customer. For example, as depicted in FIG. 1, conversational topic 165 is selected to be "Beard maintenance." Thus, this indicates that customer 115 wants to have a conversation regarding the maintenance of beards, for example, because he has questions regarding how to style his facial hair. Additionally, customer 115 can indicate his product preference 170, which can represent a product or service offered by the coffee shop that customer 115 enjoys. In FIG. 1, product preference 170 is indicate as "Yirgacheffe pour over" coffee. This profile (i.e., personal profile 155 with conversational topic 165 and product preference 170 provided) can be provided to interaction tablet 135, which can then determine whether another user with a similar profile is within the coffee shop. If so, then one or both of the customers can be recommended to meet together to interact with each other.

For example, in FIG. 1, customer 120 using mobile device 110 might have entered the coffee shop before customer 115 and provided profile 130 (also a personal profile) indicating conversational topic 180 as also being "Beard maintenance" and product preference 185 as indicating that he prefers drinking "Lattes." Interaction tablet 135 can store this information in a database and, therefore, compare the information between profile 130 and profile 125 to determine whether there are customers within the coffee shop that can be matched together for conversation.

In FIG. 1, because both customers provided personal profiles, they can be identified as potential matches. Because the personal profiles indicate the same or similar conversational topics (e.g., "Beard maintenance") then interaction tablet 135 can determine that customer 115 and customer 120 can benefit from being introduced. Thus, one or both of the customers can be provided a message by interaction tablet 135 indicating that there is another customer in the coffee shop available and interested in discussing a similar topic with some similar expectations (e.g., a casual, less formal conversation because both profiles 125 and 130 were personal profiles rather than professional profiles). In FIG. 1, because customer 120 entered the coffee shop before customer 115, customer 115 (via mobile device 105) can be provided a message depicted as GUI 150 from interaction tablet 135 indicating that theirs is someone in the coffee shop who is likely to be interested in talking.

Additionally, as depicted in GUI 150 in FIG. 1, the message received from interaction tablet 135 also indicates that customer 115 can purchase customer 120 a latte. This can be provided because it is indicated by customer 120 as his product preference 185 in profile 130. Customer 115 can select to place an order for the latte. This can provide a request back to interaction tablet 135 that customer 115 wants to order a latte, the coffee shop employees can then prepare the latte because a GUI of interaction tablet 135 can indicate to do so, and customer 115 can introduce himself to customer 120 and provide customer 120 his favorite drink as a start to a conversation 190 regarding their beards.

As a result, customer 115 can connect with customer 120 and have a meaningful conversation 190 within the coffee shop rather than sit alone at their respective tables. Additionally, the conversation can start more naturally with less or no awkwardness because the customers know a little bit more about each other, what they want to discuss, and that they're at the coffee shop for similar reasons (e.g., a personal visit rather than a professional visit for example during a coffee break from work). Moreover, the coffee shop can see more traffic (i.e., more customers) because it can be a more social gathering place, also resulting in an increase in sales.

Figure 2:
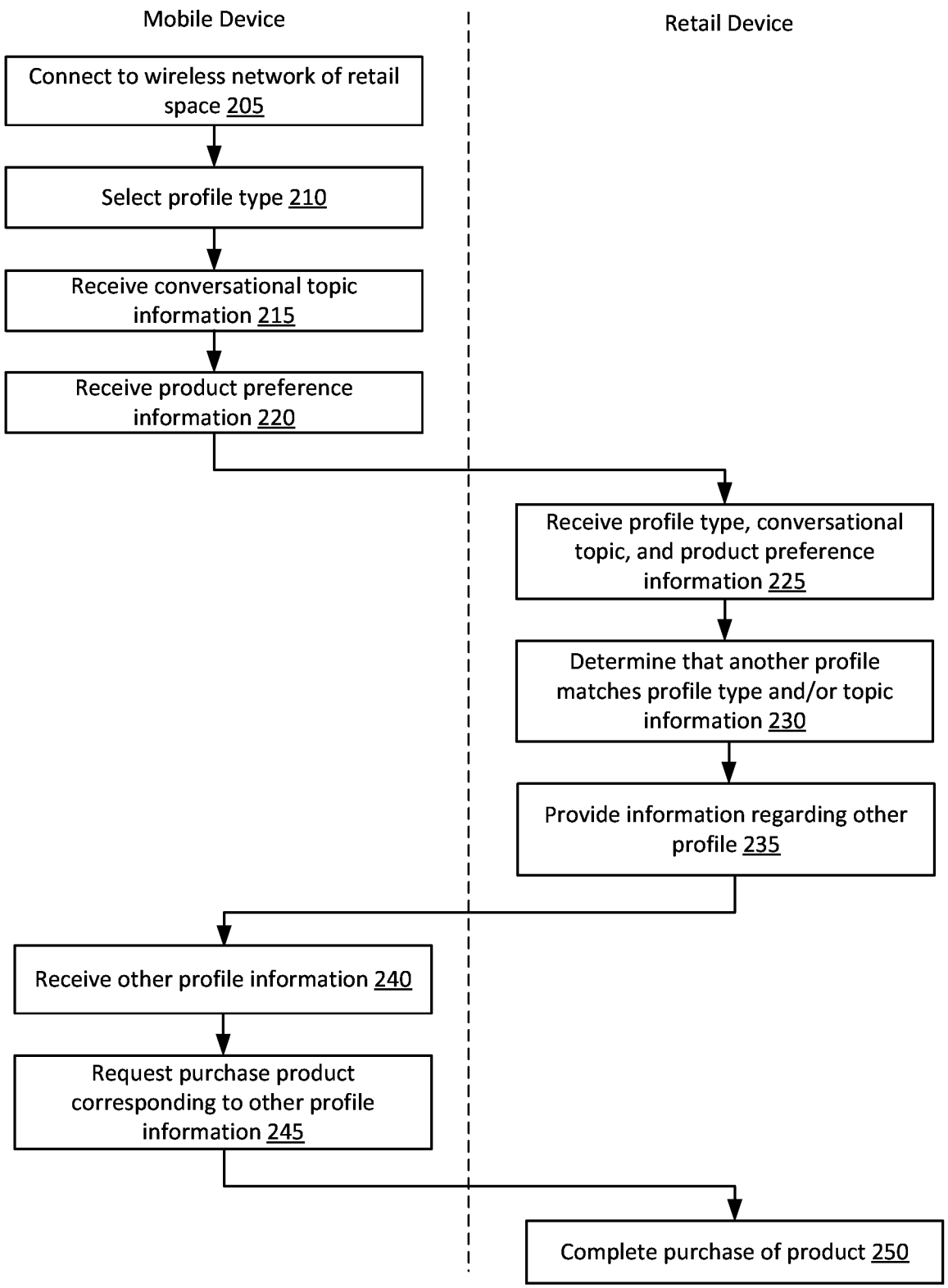
FIG. 2 illustrates an example of a block diagram for facilitating conversations among people within a physical space.

FIG. 2 illustrates an example of a block diagram for facilitating conversations among people within a physical space. In FIG. 2, a mobile device can connect to a wireless network of a retail space (205). For example, in FIG. 1, mobile device 105 can connect to the wireless network of a coffee shop in which interaction tablet 135 is also communicatively coupled with. In some implementations, this results in mobile device 105 and interaction table 135 communicating with each other and exchanging various types of data, for example, interaction tablet 135 can provide information such as the name of the coffee shop, a graphical logo, types of products or services it offers and their corresponding prices, etc.

The mobile device can then use an interaction application configured to interact with interaction tablet 135 to select a profile type (210). For example, in FIG. 1, customer 115 can use mobile device 105 to select personal profile 155 using GUI 140. This results in the interaction application indicating that customer 115 wants to use a personal profile as opposed to a professional or business profile. As discussed herein, customer 115 might want to have different profiles based on the types of interactions that he wants. In one scenario, during business hours on weekdays, he might prefer to use his professional profile. Outside of business hours on weekdays and all weekend, he might prefer to use his personal profile.

The mobile device can then receive conversational topic information (215) and product preference information (220). In some implementations, a name of the customer can also be received. For example, in FIG. 1, customer 115 can input that he would like to discuss "Beard maintenance" regarding his facial hair as conversational topic 165 and that he likes to order "Yirgacheffe pour over" to indicate that he likes to drink a pour over style coffee made from beans harvested from the Yirgachefe district of Ethiopia. In some implementations, a customer can provide many different conversational topics. For example, several keywords can be individually or collectively provided regarding a single topic or multiple topics that the customer is interested in having.

Next, the profile can be provided to the interaction tablet so that it can receive the profile type, conversational topic, and product preference (225). For example, in FIG. 1, interaction tablet 135 can receive profile 125 indicating that it is a personal profile 155 providing conversational topic 165 and product preference 170. Using that information, it can be determined that another profile matches or is similar (230). For example, in FIG. 1, interaction tablet might have been previously provided profile 130 from mobile device of another customer 120. The information of profiles 125 and 130 can be analyzed and determined whether customer 115 and customer 120 should be recommended to engage in a conversation in the coffee shop. For example, similarities between the profile type, and conversational topic can be determined. In some implementations, merely similarities between the conversational topics can be determined without consideration of profile type. Though the conversational topics are identical in FIG. 1, in other implementations, similarities between them can be determined for matching purposes. For example, one customer might input in "Beards" while another customer might put in "Facial hair" and these can be determined by interaction tablet 135, or a cloud server that interaction tablet 135 has access with, to be associated with a similar conversational topic. Thus, textual recognition can be performed by interaction tablet 135 to determine whether text from different profiles is the same, similar, or related to each other. In some implementations, this functionality might be performed by the mobile device. For example, the profiles of other customers within the store can be provided to a customer's mobile device and the mobile device can make similar determinations as interaction tablet 135.

If another customer has a profile that can be determined as belonging to someone that should be introduced, then information regarding the other profile can be provided (235) to the mobile device (240). For example, in FIG. 1, information from profile 130 can be provided to mobile device 105 used by customer 115. As depicted in GUI 150, this can include the name of customer 120 (e.g., "Byron Bunyan IV") and an indication that customer 115 can purchase a product or service for customer 120. In FIG. 1, because interaction tablet 135 is in a coffee shop, customer 115 can order a "latte" as indicated in GUI 150 for customer 120. This information (i.e., the particular object or service that can be purchased for the other customer) can also be received from profile 130. In some implementations, the information can also include location information for a customer within the retail space. For example, in FIG. 1, the location of customer 120 within the coffee shop can be provided to customer 115. The location can be a table number, a description of where customer 120 is within the store (e.g., the table in the corner), etc.

A request to purchase the product corresponding to the other profile information can be provided (245) and the purchase of the product can be completed (250). For example, if customer 115 selects that he wants to order a "latte" for customer 120 because that is what customer 120 prefers from that location, a message can be provided to interaction tablet 135. Interaction tablet 135 can then display a message available to a barrista, input in an order into an existing ordering system, etc. such that the product can be prepared. Customer 115 can then pick up the item, bring it over to the table of customer 120, and offer it as an introduction to a discussion regarding maintaining their beards (or other conversational topics).

Figure 5:
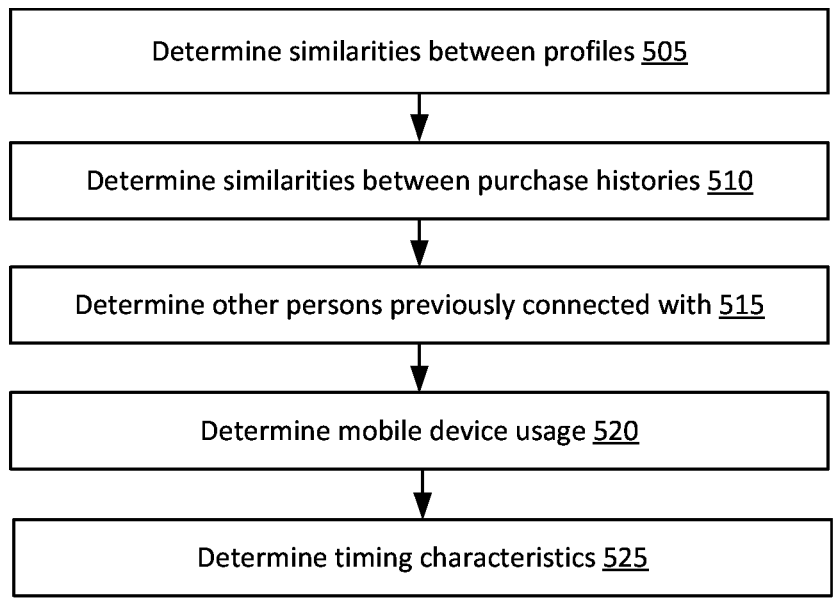
FIG. 5 illustrates an example of a block diagram for determining a match.

More information than analyzing the profiles can be used determine whether customers can be recommended to converse with each other. FIG. 5 illustrates an example of a block diagram for determining a match. In FIG. 5, similarities between the profiles can be determined (505). For example, as previously discussed, similarities between the conversational topics, profile types, even type of product preference can be determined.

Similarities between purchase histories can also be determined (510). For example, if customers often purchase the same products (e.g., X amount of times in the last Y days, the same product is purchased at least 75% of the time, etc.) from the retail store, then this can be considered when recommending customers to interact with each other. This might be done because customers might indicate similar product preferences and discussing the product can also be an introduction to a more meaningful and engaging conversation.

The persons that customers have previously connected with can also be determined (515). For example, interaction tablet 135 can store records (or it can store the records in a cloud server that it can access) indicating who customers within the store have previously interacted with. If customer 115 in and customer 120 in FIG. 1 have both previously interacted with another customer at different times, then this can be considered when matching customers. This might be done because it provides more similarities into customers and customers who interact with common other customers might have more engaging conversations themselves. As a result, conversational histories with other customers within the same physical space (e.g., within the same coffee shop) can be determined by interaction tablet 135, and similarities between conversational histories of customer 115 and customer 120 can be determined (e.g., determine that they both have had conversations with X number of the same other customers within the coffee shop). Customers 115 and 120 can then be recommended to engage with each other.

Mobile device usage can also be determined (520). For example, the interaction application can determine how the mobile device of a customer is being used. If one customer tends to browse the Internet for a significant amount of time while another customer tends to not use his mobile device in the coffee shop, then the customer who tends to not use the mobile device within the coffee shop might be selected to have a conversation with because he or she might be more open to having a conversation because they are not preoccupied with their mobile device. In some implementations, the person using the mobile device might be selected to facilitate their interactions to the social meeting place of the coffee shop. Thus, the activities of the customers using their mobile phones can be determined and used to make the determinations herein.

Timing characteristics can also be determined (525). For example, customer 115 can be at the coffee shop at 1:00 PM and two other customers can also be there at the same time. However, one of those other customers might have a history of usually visiting the store at other times (e.g., as determined by purchases by that customer, determinations that the customer is within the store based on the interactions between the interaction application of the mobile device and the interaction tablet 135, etc.). For example, perhaps 75% of the time, customer A visits the coffee shop between 12:50 PM to 1:15 PM. However, another customer B tends to visit the coffee shop between 11:00 AM to 11:30 AM around 80% of the time. Thus, customer B might usually not be available for customer 115 to connect with because he enjoys going to the coffee shop at 1:00 PM. Thus, customer B might be selected in part of this determination over customer A because customer A can be selected later because he is more of a regular during the same time around 1:00 PM. As a result, the potential number of new people for customer 110 can meet over time can be increased.

Customers having conversations with other customers can also review each other and these reviews can be determined to recommend conversations. For example, customers can provide textual reviews (e.g., summarizing their experience with the other customer), provide a rating (e.g., 4 out of 5 stars), etc. Thus, the conversations or encounters with other customers that were recommended can be reviewed. The reviews of customers can then be used to make the determinations as discussed herein.

Figure 3:
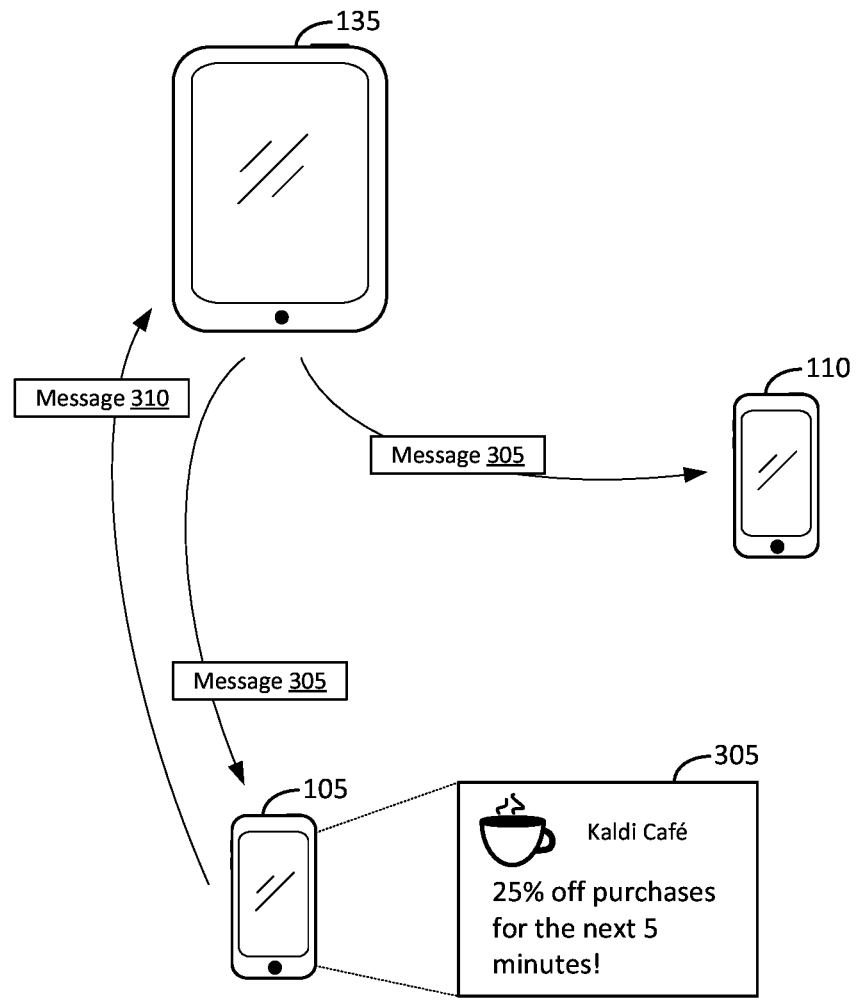
FIG. 3 illustrates an example of providing a message regarding a promotion within a physical space.

Because mobile devices can have the interaction application installed to communicate with interaction tablet 135, additional features can be brought into physical spaces such as retail stores. FIG. 3 illustrates an example of providing a message regarding a promotion within a physical space. In FIG. 3, interaction tablet 135 can be used to provide individual discounts for products or services to particular customers within the store, or even blanket discounts to all or groups of several customers within the store. For example, because the interaction applications of the mobile devices interact with interaction tablet 135, it can be determined whether a particular customer is within the store. A GUI displayed on a display screen of interaction tablet 135 can provide a representation, for example a list, of the customers in the store who have the interaction application installed. Thus, these customers can be targeted to receive a message providing information regarding a promotion within the store. The customers can then engage with the promotion (e.g., purchase a cup of coffee at a 25% discount) by indicating so in the interaction application, resulting in interaction tablet 135 receiving that indication so that an employee can carry out the purchase (e.g., make a cup of coffee, etc.).

For example, in FIG. 1, interaction tablet 135 can provide messages 305 to mobile devices 105 and 110 indicating that purchases for the next five minutes are 25% off. Mobile devices 105 and 110 can be targeted because they have the interaction application installed and they are connected to the wireless network so that they are in communication with interaction tablet 135.

In some implementations, customers who have recently engaged in a conversation using the techniques described herein and are still within the store can be identified as customers to provide message 305. For example, if one customer purchased the product preference of another customer that they were recommended to engage with in a conversation, then this can indicate that those two customers are having a conversation regarding the conversational topic in their profiles. Thus, customers can be rewarded for socializing within the store and, therefore, creating a lively environment where people would enjoy spending time. In some implementations, the product indicated as being offered at a promotional discount can be the product of customer 115 in FIG. 1 who purchased the product corresponding to the product preference of customer 120. That is, if customer 115 purchases the product that customer 120 enjoys to being a conversation, the promotional discount can reflect a promotion regarding product preference 170 of customer 115. Thus, customer 115 can receive a discount for something that he enjoys after purchasing a product for customer 120 to begin the conversation. This might extend the conversation and contribute to a more social environment with the shop.

In some implementations, customers within the store who are using a certain type of profile can be identified as customers to receive message 305. For example, customers who are visiting for personal reasons (i.e., using a personal profile) can be provided message 305 while customers who are currently using the professional profile may not receive message 305. In some implementations, customers can receive message 305 based on other information related to their profiles disclosed herein, for example, based on their indicated product preference.

In some implementations, customers can be provided messages upon entering the store. For example, when the customer's mobile device is communicatively coupled with the interaction tablet 135 via the wireless network, the mobile device can be detected and, therefore, the customer can be determined to have entered the store. The customer can then be provided a message regarding a promotion. Additionally, because the wireless network often has a range beyond the physical boundary of the store, even passing customers or potential customers can be provided a message to encourage them to enter the store. In some implementations, interaction tablet 135 can store or access purchase information of customers and then provide a message regarding a purchase based on the customer's purchase history at the store. For example, if the last purchase of the customer is determined to be a latte at a coffee shop, then when the customer is determined to have entered, they can be provided a message offering them the opportunity to order the latte because it was the last item they purchased. The customer can then select to have the latte ordered in a similar manner as disclosed elsewhere herein.

In another implementation, the customer can be provided a message indicating that they can order a product or service via their mobile device using the interaction application. The customer can provide order details (e.g., the item they wish to purchase), can be provided information regarding a discount, etc. and then they can receive a confirmation when their order is ready for pick up.

In FIG. 1, this results in mobile device 105 receiving message 305. If the customer using mobile device 105 wants to engage in the promotion, they can indicate so (e.g., selecting a button, hyperlink, etc. provided by a GUI displaying message 305) and this information can be provided back to interaction tablet 135 can they can process the order. Thus, interaction tablet 135 can provide an easy and targeted way to offer discounts depending on the time of day, lull in sales, etc.

Figure 4:
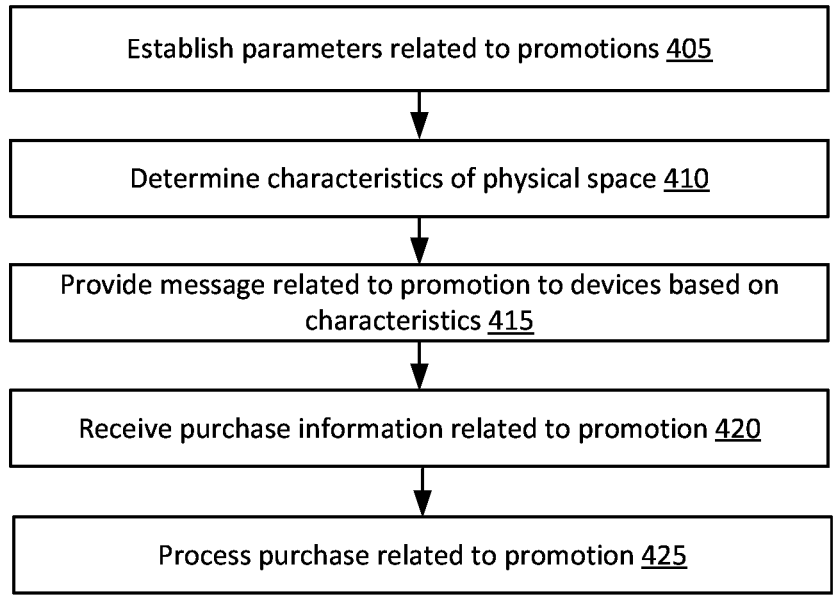
FIG. 4 illustrates an example of a block diagram for providing a message regarding a promotion within a physical space.

FIG. 4 illustrates an example of a block diagram for providing a message regarding a promotion within a physical space. In FIG. 4, parameters related to promotions can be established (405). For example, in FIG. 3, a store employee can utilize interaction tablet 135 to establish when to send out messages regarding promotions (e.g., when sales drop below a certain monetary amount (under $1000) in a particular time period (e.g., 1 hour), when the number of customers detected within the store using the interaction application is within some range (e.g., less than 10 customers), when a certain number of customers have used the interaction application to engage in conversations (e.g., 5 groups of conversations currently engaged within the store), etc.). In another example, when a new customer is determined to have entered the store can be a parameter. Eventually, characteristics of the physical space can be determined (410). For example, any of the aforementioned conditions can be determined to have been met. In some implementations, an employee of the store can manually select to send a promotion.

A message related to the promotion can then be provided to the devices based on the determined characteristics (415). For example, in FIG. 3, message 305 can be provided by interaction tablet 135 to mobile devices 105 and 110 upon the determination of the characteristics of the environment of the retail store. Thus, customers can receive information indicating that they are being offered a promotion related to the products or services of the store. Using the interaction application, the customers can indicate that they want to engage with the promotion. Thus, purchase information regarding the promotion can be received (420). As a result, interactive tablet 135 can then process the purchases (425). For example, it can indicate to an employee that he or she needs to prepare the products related to the promotion.

Interaction tablet 135 can also enable additional features within the physical spaces it is placed within. For example, a customer can be able to "gift" a purchase to another customer within the store. A customer can use his or her interaction application, which can interface with interaction tablet 135 to receive data indicating other customers within the store and purchase that customer a product. For example, the profiles of other customers that they have activated using the interaction application can be listed and viewed for additional insight into that customer. That customer can then receive a message indicating who purchased the product and that the product is available or has been purchased for them.

In some implementations, customers can provide their credit card information, gift card information, loyalty card information, or other forms of payments to facilitate the purchases described herein.

In some implementations, customers can use both personal and business profiles at the same time. For example, in FIG. 1, customer 115 can enable both personal profile 155 and professional profile 160. The different profiles can indicate different information (e.g., different conversational topics).

In some implementations, more than two customers can be recommended to have a conversation. For example, three different customers might have similarities in their information (e.g., from their profiles) in a way that they might have a meaningful group conversation. Thus, in some implementations, customers can indicate a maximum, minimum, or a range of customers to be included in a potential conversation within the coffee shop. In some implementations, to encourage such lively conversations, the retail space might offer a higher promotional discount than if customers are engaged in two-customer conversations or are by themselves. In some implementations, interaction tablet 135 does not recommend conversations, rather, the customers can use the interaction application (and any functionality related to interaction tablet 135) to explore other customers within the area to be aware of each other and then connect as they wish.

In some implementations, interaction tablet 135 is not included. For example, two different people with the interaction application installed upon their mobile devices might be walking on the same street. The interaction application can use cellular communications, global positioning satellite (GPS) systems, etc. to determine that the users are within close proximity and then recommend conversations as disclosed herein.

Figure 6:
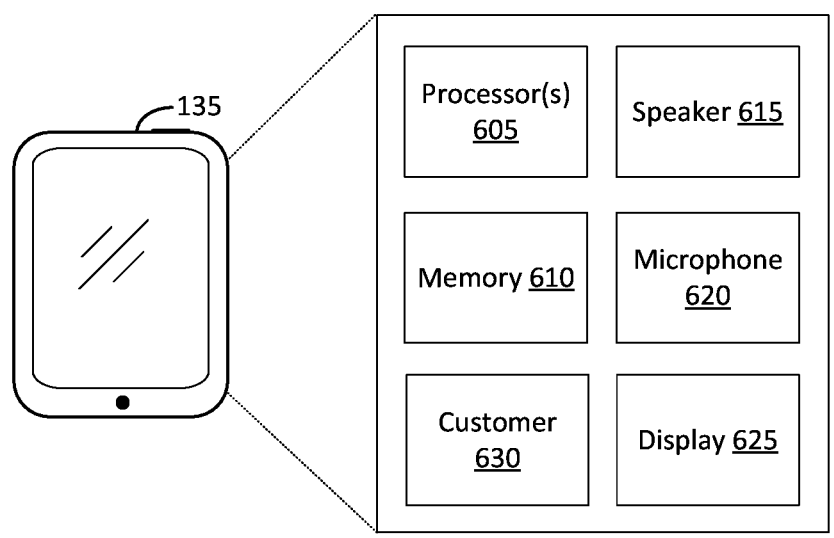
FIG. 6 illustrates an example of a device for facilitating conversations.

FIG. 6 illustrates an example of a device for facilitating conversations. In FIG. 6, assistant device 105 includes a processor 605, memory 610, touchscreen display 625, speaker 615, microphone 635, as well as other types of hardware such as non-volatile memory, an interface device, camera, radios, etc. to implement customer management logic 630 providing the techniques disclosed herein. For example, customer management logic 630 can implement a variety of modules, units, components, logic, etc. implemented via circuitry and other hardware and software to provide a customer interaction logic (e.g., to determine similarities, etc. between customers), customer engagement logic (e.g., to connect customers, perform purchases, etc.), etc. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method, comprising:
receiving, by a processor, a first profile information of a first customer, the first profile information representing a conversational topic that the first customer is interested in having within a physical space, the first profile information also indicating a reference to a product or a service that the first customer prefers to purchase from the physical space;
determining, by the processor, that a second profile information of a second customer that is within the physical space also represents the conversational topic that the second customer is interested in having within the physical space;
providing, by the processor, information regarding the second customer within the physical space to the first customer based on the determination that the second profile information also represents the conversational topic, the information including a reference to a product or service that the second customer prefers to obtain from the retail space;
receiving, by the processor, a request from the first customer to purchase the product or service; and
generate, by the processor, an indication representing that the first customer wishes to purchase the product or service for the second customer to facilitate a conversation regarding the conversational topic.

2. The method of claim 1, wherein the first profile information of the first customer also represents a first profile type, and the second profile information of the second customer also represents a second profile type, the first profile type of the first profile information and the second profile type of the second profile information being one of a personal profile or a business profile.

3. The method of claim 2, wherein the personal profile and the business profile represent a context regarding the conversational topic.

4. The method of claim 2, further comprising:
determining that the first profile type and the second profile type are similar, wherein providing the information regarding the second customer within the physical space is further based on the determination that the first profile type and the second profile type are similar.

5. The method of claim 1, further comprising:
determining similarities between purchase histories of the first customer and the second customer, the purchase histories representing purchases of products or services related to the physical space, wherein providing the information regarding the second customer within the physical space is further based on the similarities between the purchase histories.

6. The method of claim 1, further comprising:
determining similarities between conversational histories of the first customer and the second customer within the physical space, wherein providing the information regarding the second customer within the physical space is further based on the similarities between the conversational histories.

7. The method of claim 1, wherein the first customer and the second customer are both within the physical space.

8. The method of claim 7, wherein the first mobile device corresponding to the first customer and the second mobile device corresponding to the second customer are communicatively coupled with a wireless network implemented within the physical space.

9. The method of claim 8, further comprising:
determining that the first customer and the second customer are engaged in the conversation; and
providing a message regarding a promotional discount of a product or a service provided by the physical space based on the determination that the first customer and the second customer are engaged in the conversation.

10. A system, comprising:
a database storing a first profile information of a first customer having a first mobile device that is within a physical space, the first profile information indicating a conversational topic that the first customer is interested in within the physical space, the first profile information also indicating a reference to a product or a service that the first customer prefers to purchase from the physical space;
a customer interaction logic configured to determine that a second customer having a second mobile device has entered the physical space and is associated with a second profile information indicating a conversational topic that the second customer is interested in within the physical space, and configured to determine that the conversational topic of the first profile information and the second profile information are similar; and
a customer engagement logic configured to provide information regarding the first customer within the physical space to the second mobile device of the second customer, the information including a reference to the product or the service that the first customer prefers, and configured to generate an indication that the first customer wishes to purchase the product of the service for the second customer to facilitate a conversation regarding the conversational topic.

11. The system of claim 10, wherein the first profile information of the first customer also represents a first profile type, and the second profile information of the second customer also represents a second profile type, the first profile type of the first profile information and the second profile type of the second profile information being one of a personal profile or a business profile.

12. The system of claim 11, wherein the personal profile and the business profile represent a context regarding the conversational topic.

13. The system of claim 11, wherein the customer interaction logic is further configured to determine that the first profile type and the second profile type are similar, wherein providing the information regarding the second customer within the physical space is further based on the determination that the first profile type and the second profile type are similar.

14. The system of claim 10, wherein the customer interaction logic is further configured to determine similarities between purchase histories of the first customer and the second customer, the purchase histories representing purchases of products or services related to the physical space, wherein providing the information regarding the second customer within the physical space is further based on the similarities between the purchase histories.

15. The system of claim 10, wherein the customer interaction logic is further configured to determine similarities between conversational histories of the first customer and the second customer within the physical space, wherein providing the information regarding the second customer within the physical space is further based on the similarities between the conversational histories.

16. The system of claim 10, wherein the first customer and the second customer are both within the physical space.

17. The system of claim 16, wherein the first mobile device corresponding to the first customer and the second mobile device corresponding to the second customer are communicatively coupled with a wireless network implemented within the physical space.

18. The system of claim 17, wherein the customer interaction logic is further configured to determine that the first customer and the second customer are engaged in the conversation and configured to provide a message regarding a promotional discount of a product or a service provided by the physical space based on the determination that the first customer and the second customer are engaged in the conversation.

19. A computer program product, comprising one or more non-transitory computer-readable media having computer program instructions stored therein, the computer program instructions being configured such that, when executed by one or more computing devices, the computer program instructions cause the one or more computing devices to:
receive a first profile information of a first customer, the first profile information representing a conversational topic that the first customer is interested in having within a physical space, the first profile information also indicating a reference to a product or a service that the first customer prefers to purchase from physical space;
determine that a second profile information of a second customer that is within the physical space also represents the conversational topic that the second customer is interested in having within the physical space;
provide information regarding the second customer within the physical space to the first customer based on the determination that the second profile information also represents the conversational topic, the information including a reference to a product or service that the second customer prefers to obtain from the retail space;
receive a request from the first customer to purchase the product or service; and
generate an indication representing that the first customer wishes to purchase the product or service for the second customer to facilitate a conversation regarding the conversational topic.

20. The computer program product of claim 19, wherein the first profile information of the first customer also represents a first profile type, and the second profile information of the second customer also represents a second profile type, the first profile type of the first profile information and the second profile type of the second profile information being one of a personal profile or a business profile.

21. The computer program product of claim 20, wherein the personal profile and the business profile represent a context regarding the conversational topic.

22. The computer program product of claim 20, the computer program instructions cause the one or more computing devices to:
determine that the first profile type and the second profile type are similar, wherein providing the information regarding the second customer within the physical space is further based on the determination that the first profile type and the second profile type are similar.

23. The computer program product of claim 19, the computer program instructions cause the one or more computing devices to:
- determine similarities between purchase histories of the first customer and the second customer, the purchase histories representing purchases of products or services related to the physical space, wherein providing the information regarding the second customer within the physical space is further based on the similarities between the purchase histories.

24. The computer program product of claim 19, the computer program instructions cause the one or more computing devices to:
- determine similarities between conversational histories of the first customer and the second customer within the physical space, wherein providing the information regarding the second customer within the physical space is further based on the similarities between the conversational histories.

25. The computer program product of claim 19, wherein the first customer and the second customer are both within the physical space.

26. The computer program product of claim 25, wherein the first mobile device corresponding to the first customer and the second mobile device corresponding to the second customer are communicatively coupled with a wireless network implemented within the physical space.

27. The computer program product of claim 26, the computer program instructions cause the one or more computing devices to:
- determine that the first customer and the second customer are engaged in the conversation; and
- provide a message regarding a promotional discount of a product or a service provided by the physical space based on the determination that the first customer and the second customer are engaged in the conversation.

28. A method, comprising:
- selecting a first profile type representing that a first customer having a first mobile device is interesting in having a conversation in one of a personal context or a business context within a physical space;
- providing a conversational topic related to the conversation;
- generating, by a processor, a first profile representing that the first customer is interested in having the conversation corresponding to the conversational topic within the physical space in the personal or the business context;
- providing the first profile representing the first customer to an interaction tablet housed within the physical space, the interaction tablet configured to communicate with mobile devices of customers within the physical space;
- receiving a second profile representing that a second customer having a second mobile device is also interesting in having the conversation corresponding to the conversational topic within the physical space in the personal or the business context associated with the first profile, the second profile also indicating a preference for a product or a service that the second customer prefers to obtain within the physical space; and
- generate, by the processor, a request representing that the first customer wishes to purchase the product or the service corresponding to the preference of the second customer to facilitate the conversation regarding the conversational topic.

29. The method of claim 28, wherein the first customer and the second customer are both within the physical space.

30. The method of claim 29, wherein the first mobile device, the second mobile device, and the interaction tablet are communicatively coupled to a wireless network implemented within the physical space.

* * * * *